J. F. BURNS.
PIPE HANGER.
APPLICATION FILED OCT. 4, 1913.
1,233,181.
Patented July 10, 1917.
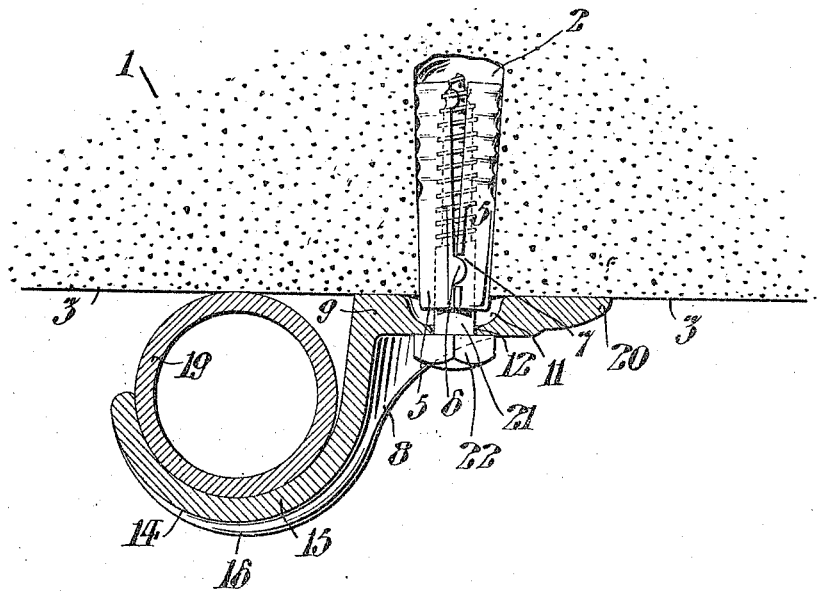
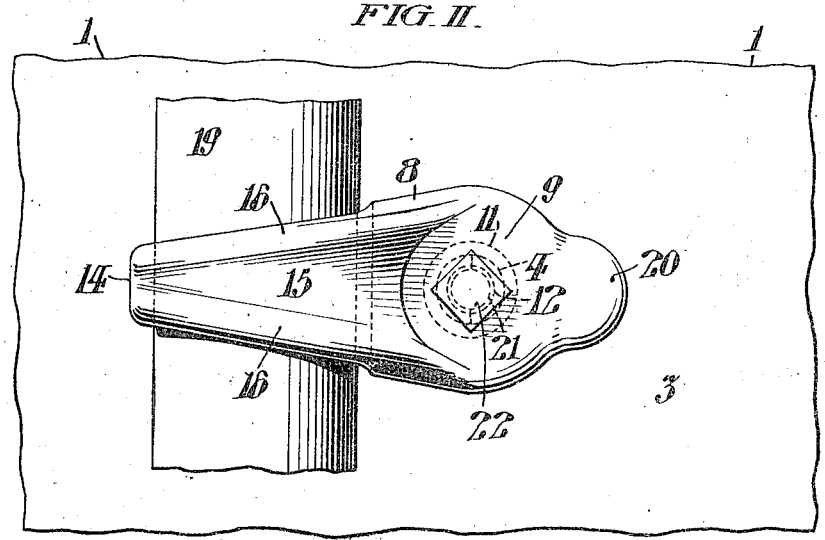
WITNESSES:
Philip W. Vessey
Joseph E. Segal
INVENTOR:
James F. Burns,

UNITED STATES PATENT OFFICE.

JAMES F. BURNS, OF PHILADELPHIA, PENNSYLVANIA.

PIPE-HANGER.

1,233,181.   Specification of Letters Patent.   Patented July 10, 1917.

Application filed October 4, 1913. Serial No. 793,308.

*To all whom it may concern:*

Be it known that I, JAMES F. BURNS, a citizen of the United States, residing at Philadelphia, in the State of Pennsylvania, have invented a certain new and useful Improvement in Pipe-Hangers, wherein the following is a specification, reference being had to the accompanying drawing.

My invention relates to hangers adapted to hold single pipes against plane wall faces. As ordinarily constructed such hangers require two bolts, respectively at opposite ends thereof, to hold them in connection with the wall. It is the object of my invention to provide a hanger so constructed and arranged that it will properly secure a pipe to a wall by the use of one attaching bolt. Such a hanger is particularly adapted for use in connection with walls of concrete, stone, or brick, in which holes must be drilled to receive any attaching bolts, and the principal advantage of my improvement is that but one-half of the labor required to effect the attachment of an ordinary hanger to such a wall, is required to effect the attachment of my improved hanger.

It is usual to employ expansion bolts as the means for connecting pipe hangers to the hard walls above contemplated, and in practice it is found that unless means are employed to hold the expansion bolt nuts in the holes in the wall while the bolts are being inserted therein, the nuts are partly drawn out, so as to project beyond the plane face of the wall when the bolt is tightened in engagement therewith. The effect of such protrusion of the bolt nuts is to lift the pipe hangers from their proper bearing upon the wall face and render their attachment insecure. Therefore a further object of my invention is to so construct the pipe hanger that it is not thrust away from the wall by the protrusion of the nut by which it is connected to the wall.

As hereinafter described my invention includes the combination with a wall having a circular recess for an expansion nut, extending transversely to the wall face; of a split expansion nut including separable members seated in said recess and projecting outwardly from said wall face; a pipe hanger including a base arranged to bear upon said wall face and having a socket registering with the projecting end of said nut, and a bolt hole in concentric relation therewith; a circularly curved pipe hook extending from said base and including a web having reinforcing ribs coextensive with its opposite edges and filleted in unitary relation with said base; said hook being coextensive with the width of said base at its junction therewith, and tapered so that its distal end is approximately one-half the width of its basal end; a pipe extending parallel with said wall face and engaged by said hook; a tail on said base extending oppositely from said hook and bearing upon said wall face; and a single expansion bolt engaging said nut and having a head clamping said base against said wall face; whereby said hanger, pipe and nut are clamped in rigid parallel relation with said wall face by said single expansion bolt.

My invention includes the various novel features of construction and arrangement hereinafter more definitely specified.

In the drawing; Figure I is a fragmentary sectional view of a wall showing a convenient form of my invention applied thereto.

Fig. II is a fragmentary face view of said wall and the form of my invention shown in Fig. I.

In said figures the concrete wall 1 has the circular and conoidal recess 2 extending with its axis at right angles to the wall face 3 to receive the split expansion nut 4 including the two separable members 5 which are oppositely counterpart and hingedly connected by lugs 6 which are arranged to rock in notches 7; each of said members 5 having a lug 6 upon one side and a notch 7 upon the other.

The pipe hanger 8 includes the substantially circular base 9 arranged to bear upon said wall face 3 and having the nut socket 11, registering with the projecting end of said nut, and the bolt hole 12 in concentric relation therewith. Said socket 11 is of such shape and extent as to permit the protrusion of said nut from the wall without lifting the hanger from its bearing upon the wall face 3. The circularly curved pipe hook 14 extends from said base 9 at one side thereof, being coextensive with the width of said base at its junction therewith, and includes the web 15 having the reinforcing ribs 16 coextensive with its opposite edges and filleted in unitary relation with said base. Said hook is tapered, as shown in Fig. II, so that its distal end is approximately one-half the width of its basal end and is curved to hold a pipe 19 between said wall 1 and hook 14 with said pipe extending parallel with said wall face 3.

Said base 9 has the tail member 20 extending oppositely from said hook and bearing upon said wall face 3 so as to brace said hook 14 against the pressure of said pipe, and the single expansion bolt 21 which is so shaped in correlation with the nut as to separate the members 5 of the latter, as indicated in Fig. I, has the square head 22 by which it may be turned and by which it clamps said base 9 against said wall face 3; whereby said hanger, pipe and nut are clamped in rigid relation with said wall face 3 by said single expansion bolt 21.

Although I have shown a pipe hanger having a nut socket 11 so large that the nut 4 does not engage the hanger; it is to be understood that a hanger made in accordance with my invention may have a nut socket so constructed and arranged in relation to the nut as to engage and prevent the rotation of the nut, although permitting the latter to project from the wall to a variable degree without disturbing the bearing of the hanger thereon.

I do not desire to limit myself to the precise details of construction and arrangement herein set forth, as it is obvious that various modifications may be made therein without departing from the essential features of my invention as defined in the appended claim.

I claim:—

A pipe hanger including a substantially circular base arranged to bear upon a plane wall face and having a socket in its bearing face and a bolt hole in concentric relation therewith; a pipe hook extending from said base and coextensive with the width thereof at its junction therewith, including a web having reinforcing ribs coextensive with its opposite edges and filleted in unitary relation with said base; said hook being tapered so that its distal end is approximately one half the width of its basal end; and a tail on said base extending oppositely from said hook and arranged to bear upon said wall face; a nut set in said wall and projecting therefrom into said socket; and a bolt extending through the bolt hole in said pipe hanger in engagement with said nut.

In testimony whereof, I have hereunto signed my name at Philadelphia, Pennsylvania, this third day of October, 1913.

JAMES F. BURNS.

Witnesses:
ARTHUR E. PAIGE,
ANNA ISRAELUTZ.